J. C. L. ADAMS.
CUTTER STAY FOR PLOWS.
APPLICATION FILED JUNE 30, 1908.
907,671.
Patented Dec. 22, 1908.
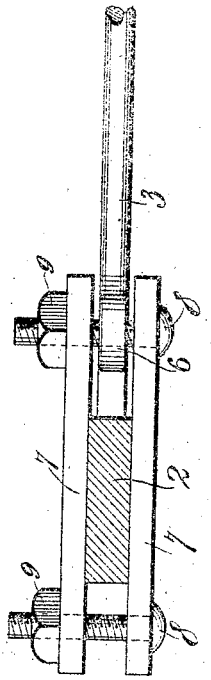
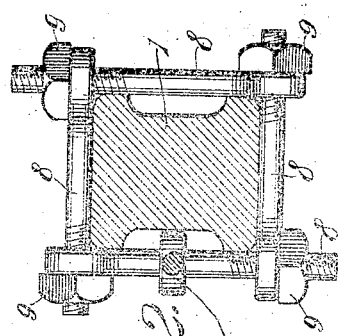
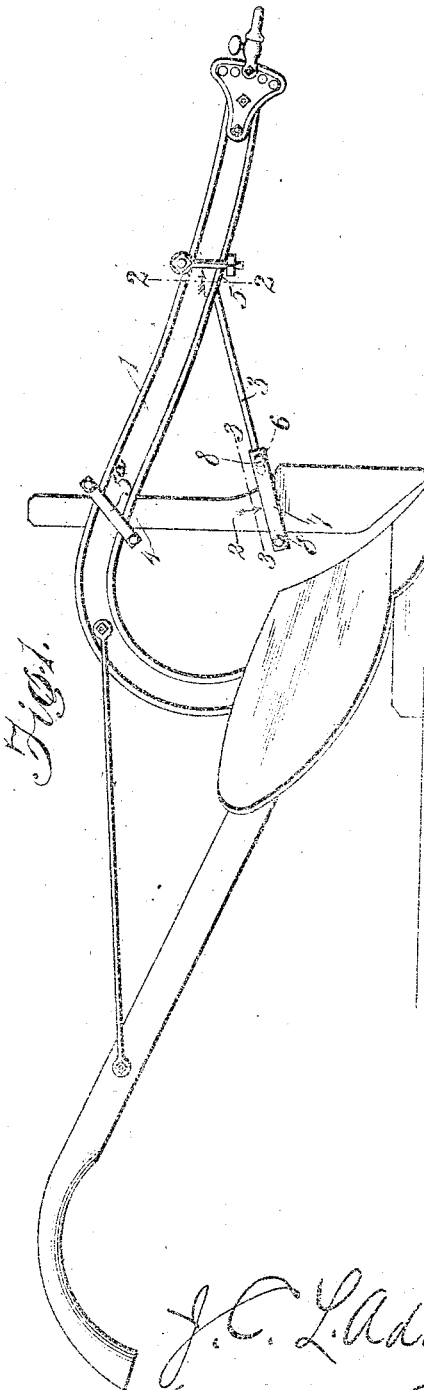
Witnesses
Rose S. Johnson
M. L. Skinner
Inventor
J. C. L. Adams
By Watson E. Coleman
Attorney

UNITED STATES PATENT OFFICE.

JOHN C. L. ADAMS, OF SAYLOR, OKLAHOMA.

CUTTER-STAY FOR PLOWS.

No. 907,671.  Specification of Letters Patent.  Patented Dec. 22, 1908.

Application filed June 30, 1908. Serial No. 441,254.

*To all whom it may concern:*

Be it known that I, JOHN C. L. ADAMS, a citizen of the United States, residing at Saylor, in the county of Haskell and State of Oklahoma, have invented certain new and useful Improvements in Cutter-Stays for Plows, of which the following is a specification, reference being had to the accompanying drawings.

My invention is an improved brace or stay for connecting a cutter bar or equivalent device to the beam of a plow or similar implement.

The principal object of the invention is to provide a simple, inexpensive, and practical device of this character which will effectively brace the cutter so that when applied to an ordinary plow the latter may be effectively used to plow new ground.

With the above and other objects in view, the invention consists of the novel features of construction and the combination and arrangement of parts hereinafter fully described and claimed, and illustrated in the accompanying drawings, in which—

Figure 1 is a side elevation of a plow showing my invention applied thereto for bracing an upright cutter bar; Fig. 2 is a cross sectional view taken on the plane indicated by the line 2—2 in Fig. 1; and Fig. 3 is a detail section taken on the plane indicated by the line 3—3 in said figure.

In the drawings 1 denotes the beam of a plow or analogous implement, 2 an upright cutter bar and 3 my improved brace or stay which is arranged between the latter and the front portion of the beam. The cutter 2 has a flat upper end or shank 4 which may be fastened to the beam 1 in any suitable manner, but which is here shown as clamped against one side of said beam by a clamp 5ᵃ consisting of flat plates or bars united by clamping bolts. The lower end of the cutter is enlarged and has its front edge beveled or sharpened to provide a cutting edge which when applied to the plow is disposed in front of the plow share on the standard at the rear of the beam 1.

My improved brace or stay 3 comprises a rod formed at its opposite ends with eyes 5, 6 which are disposed in planes at right angles to each other. The eye 6 at the lower or rear end of the brace rod is arranged between two clamping plates 7 engaged with the opposite sides of the cutter 2 and formed adjacent to their ends with alining apertures to receive clamping bolts 8, one of said bolts passing through the eye 6, as clearly shown in Fig. 3 to simultaneously secure the clamp to the cutter and the brace rod to the clamp. The upper or forward end of the brace rod is connected to the beam by a clamp which consists of four eye bolts 8 the threaded shank of each of which is passed through the eye of one of the others and is adapted to receive a nut 9. The eye bolts 8 are so arranged as to receive the beam 1 between them in order that when the nuts 9 are tightened they will effectively clamp the beam. One of the eye bolts 8 passes through the eye 5 on the brace rod so that the clamp serves to unite the latter to the beam.

It will be noted that the invention is exceedingly simple in construction so that it may be produced at a small cost and will be strong and effective.

While the invention is especially designed for use in bracing the lower portion of an upright cutter bar upon a plow in order that an ordinary plow may be effectively used for plowing a new ground, it will be understood that it may be used for analogous purposes on plows and other implements.

Having thus described my invention what I claim is:

1. A brace for connecting a cutter bar or the like to the beam of a plow or similar implement comprising a rod having an eye at one end, means at its other end for connecting it to a cutter bar, and a beam engaging clamp consisting of eye bolts, each having its threaded end passed through the eye of one of the others, one of the bolts being passed through said eye at the end of the rod.

2. A clamp consisting of a plurality of eye bolts, each having its threaded end passed through the eye of one of the others and nuts upon the threaded ends of said bolts.

In testimony whereof I hereunto affix my signature in the presence of two witnesses.

JOHN C. L. ADAMS.

Witnesses:
  C. C. BIRKENMEUR,
  S. E. FARR.